(12) United States Patent
Stock

(10) Patent No.: US 9,261,104 B2
(45) Date of Patent: Feb. 16, 2016

(54) AIR BLOWER FOR A MOTOR-DRIVEN COMPRESSOR

(75) Inventor: Darrell A. Stock, Huntersville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 1529 days.

(21) Appl. No.: 11/533,228

(22) Filed: Sep. 19, 2006

(65) Prior Publication Data

US 2007/0065317 A1    Mar. 22, 2007

Related U.S. Application Data

(60) Provisional application No. 60/718,388, filed on Sep. 19, 2005.

(51) Int. Cl.
| | |
|---|---|
| F04B 35/04 | (2006.01) |
| F04D 29/053 | (2006.01) |
| F04D 25/06 | (2006.01) |
| F04D 25/08 | (2006.01) |
| F04D 29/58 | (2006.01) |

(52) U.S. Cl.
CPC .............. *F04D 29/053* (2013.01); *F04D 25/06* (2013.01); *F04D 25/082* (2013.01); *F04D 29/584* (2013.01)

(58) Field of Classification Search
CPC ..... F04D 25/082; F04D 29/124; F04D 29/04; F04D 29/58; F04D 29/5806; F04D 29/106; F04D 29/582; F04D 29/584; F04B 39/06; F04B 53/08; H02K 1/32; H02K 5/20; H02K 9/00
USPC ................. 417/366, 368, 369, 370, 371, 372, 417/423.5, 423.8, 423.9, 423.11, 423.12, 417/423.2, 423.13; 415/171.1, 229, 230, 415/72, 111, 168.1, 168.2, 168.3, 169.3, 415/169.4; 277/430; 310/52, 60 R, 62, 63; 416/89; 464/180, 179, 183, 185
See application file for complete search history.

(56) References Cited

U.S. PATENT DOCUMENTS

| | | | | |
|---|---|---|---|---|
| 2,583,583 A | * | 1/1952 | Mangan | ......................... 417/372 |
| 2,700,740 A | | 1/1955 | Heintz | |
| 2,735,026 A | | 2/1956 | Moerk | |
| 2,913,988 A | * | 11/1959 | White | ............................ 417/357 |
| 2,938,661 A | * | 5/1960 | Ricketts | ......................... 415/111 |
| 3,060,335 A | * | 10/1962 | Greenwald | ..................... 310/54 |
| 3,135,213 A | | 6/1964 | Smith et al. | |
| 3,353,043 A | | 11/1967 | Albright | |
| 3,420,184 A | * | 1/1969 | Englesberg et al. | .......... 417/420 |
| 3,513,942 A | * | 5/1970 | Tetsuya | ............................. 184/6 |
| 3,767,321 A | | 10/1973 | Layne | |

(Continued)

FOREIGN PATENT DOCUMENTS

| | | |
|---|---|---|
| DE | 1200470 | 9/1965 |
| EP | 0650690 | 5/1995 |
| JP | 54123711 | 9/1979 |

*Primary Examiner* — Devon Kramer
*Assistant Examiner* — Amene Bayou
(74) *Attorney, Agent, or Firm* — Taft Stettinius & Hollister, LLP

(57) ABSTRACT

A fluid compression system includes a compressor, an electric motor including a stator and a rotor positioned adjacent to the stator, and a shaft coupled to the rotor to support the rotor for rotation and having a drive end and a non-drive end. A plurality of flow-inducing elements are integrally-formed as part of the shaft and is adapted to induce a flow of fluid from the non-drive end toward the drive end in response to rotation of the shaft.

17 Claims, 8 Drawing Sheets

(56) References Cited

U.S. PATENT DOCUMENTS

| | | | | |
|---|---|---|---|---|
| 3,997,803 | A | 12/1976 | Mishra | |
| 4,120,616 | A | 10/1978 | Dwyer et al. | |
| 4,132,416 | A * | 1/1979 | Adams, Jr. | 277/412 |
| 4,236,879 | A | 12/1980 | Abe | |
| 4,443,043 | A * | 4/1984 | Yamaguchi | 310/90.5 |
| 4,456,437 | A | 6/1984 | Kurahayashi et al. | |
| 4,478,559 | A | 10/1984 | Andrione et al. | |
| 4,527,960 | A | 7/1985 | DeSisto | |
| 4,616,980 | A | 10/1986 | Carpenter | |
| 4,767,286 | A | 8/1988 | Kohl et al. | |
| 4,958,991 | A * | 9/1990 | Kikuchi | 418/55.6 |
| 4,990,055 | A * | 2/1991 | Korenblit | 415/144 |
| 4,997,340 | A * | 3/1991 | Zinsmeyer et al. | 415/105 |
| 5,038,891 | A | 8/1991 | Wallis | |
| 5,088,899 | A * | 2/1992 | Blecker et al. | 417/356 |
| 5,102,305 | A * | 4/1992 | Bescoby et al. | 417/407 |
| 5,129,795 | A * | 7/1992 | Hyland | 417/423.12 |
| 5,178,523 | A | 1/1993 | Cheng-Chung | |
| 5,256,038 | A * | 10/1993 | Fairman | 417/423.11 |
| 5,288,213 | A | 2/1994 | Nasr | |
| 5,308,229 | A * | 5/1994 | DuPuis et al. | 417/368 |
| 5,365,133 | A | 11/1994 | Raad | |
| 5,427,456 | A | 6/1995 | Hensel | |
| 5,451,066 | A * | 9/1995 | Totain | 277/347 |
| 5,464,332 | A | 11/1995 | Beck et al. | |
| 5,548,437 | A | 8/1996 | Yoshimoto et al. | |
| 5,559,382 | A | 9/1996 | Oku et al. | |
| 5,567,132 | A * | 10/1996 | Dupuis et al. | 417/420 |
| 5,624,244 | A * | 4/1997 | Moon | 417/366 |
| 5,624,245 | A | 4/1997 | DeClerck et al. | |
| 5,697,767 | A * | 12/1997 | Bissell et al. | 417/350 |
| 5,911,565 | A | 6/1999 | Mann et al. | |
| 6,043,580 | A * | 3/2000 | Vogel et al. | 310/179 |
| 6,071,092 | A * | 6/2000 | Casaro et al. | 417/423.4 |
| 6,191,511 | B1 * | 2/2001 | Zysset | 310/60 A |
| 6,361,271 | B1 * | 3/2002 | Bosley | 415/72 |
| 6,426,574 | B1 | 7/2002 | Hess et al. | |
| 6,435,822 | B1 * | 8/2002 | Kobayashi et al. | 415/172.1 |
| 6,630,758 | B2 | 10/2003 | Aoki et al. | |
| 6,653,757 | B2 | 11/2003 | Schlenker | |
| 6,685,447 | B2 | 2/2004 | Mabe et al. | |
| 6,760,187 | B2 | 7/2004 | Asada et al. | |
| 6,966,746 | B2 * | 11/2005 | Cardenas et al. | 415/1 |
| 2001/0043871 | A1 | 11/2001 | Rennett et al. | |
| 2002/119038 | A1 * | 8/2002 | Abdallah | 415/1 |
| 2004/0036367 | A1 | 2/2004 | Denton et al. | |
| 2006/0257274 | A1 * | 11/2006 | Umeoka et al. | 417/415 |

* cited by examiner

AIR BLOWER FOR A MOTOR-DRIVEN COMPRESSOR

CROSS REFERENCE TO RELATED APPLICATIONS

This application claims priority under 35 U.S.C. sec. 119 to provisional patent application Ser. No. 60/718,388, filed on Sep. 19, 2005, which is hereby fully incorporated by reference.

BACKGROUND

The present invention relates to a blower for a motor. More particularly, the present invention relates to a blower that is integrally-formed as part of a motor that drives a compressor.

Motors are often used to drive compressors to produce a flow of compressed fluid. When used to drive a centrifugal compressor, the motor must rotate at a relatively high speed (e.g., greater than 30,000 RPM) to efficiently drive the compressor. In addition, it is desirable to employ a variable speed motor to allow for more accurate and efficient control of the quantity of compressed fluid produced. High power-density permanent magnet motors are well suited to driving centrifugal compressors. However, accurate and reliable temperature control within the housing of the high-speed, high power-density permanent magnet electric motor is needed to inhibit loss of magnetic properties of the core, damage to the electric insulation of the stator, and the malfunction of the rotor-bearing system.

Prior air cooled motors often employed a separate blower that directed air through the motor. The separate blower, driven by a separate motor, was generally required as the speed of the permanent magnet motor is too high to employ a directly-driven fan. However, the use of the second motor to drive the blower can be problematic if the motor or the blower fail during operation of the permanent magnet motor. Such a failure could reduce or eliminate the flow of cooling air which might result in motor overheating.

SUMMARY

In one embodiment, the invention provides a fluid compression system that includes a compressor, an electric motor including a stator and a rotor positioned adjacent to the stator, and a shaft coupled to the rotor to support the rotor for rotation and having a drive end and a non-drive end. A plurality of flow-inducing elements are integrally-formed as part of the shaft and is adapted to induce a flow of fluid from the non-drive end toward the drive end in response to rotation of the shaft.

In another embodiment, the invention provides a fluid compression system that includes a centrifugal compressor that defines a high-pressure side and a low-pressure side. The compressor is operable to produce a high-pressure flow that exits the compressor at the high-pressure side. A motor includes a shaft coupled to the centrifugal compressor and a non-drive end and a drive end. The drive end is positioned adjacent the compressor. A housing contains at least a portion of the centrifugal compressor and the motor. The housing defines a vent that facilitates the passage of a portion of the high-pressure flow. A blower is coupled to the shaft and is operable to induce a flow of cooling fluid from the non-drive end toward the drive end such that the flow of cooling fluid exits the housing through the vent.

In another embodiment, the invention provides a fluid compression system that includes a housing that at least partially defines a vent aperture, a seal portion, and a cooling passage. A centrifugal compressor is at least partially supported by the housing and is adapted to produce a flow of high-pressure fluid. A portion of the high-pressure fluid passes through the seal portion and exits the housing through the vent aperture. A motor includes a rotor supported by a shaft. The motor is coupled to the centrifugal compressor and is operable to drive the compressor. A blower is integrally-formed as one piece with the shaft and is operable in response to rotation of the shaft to produce a flow of cooling air within the cooling passage. The flow of cooling air inhibits the passage of high-pressure fluid into the motor.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 1:
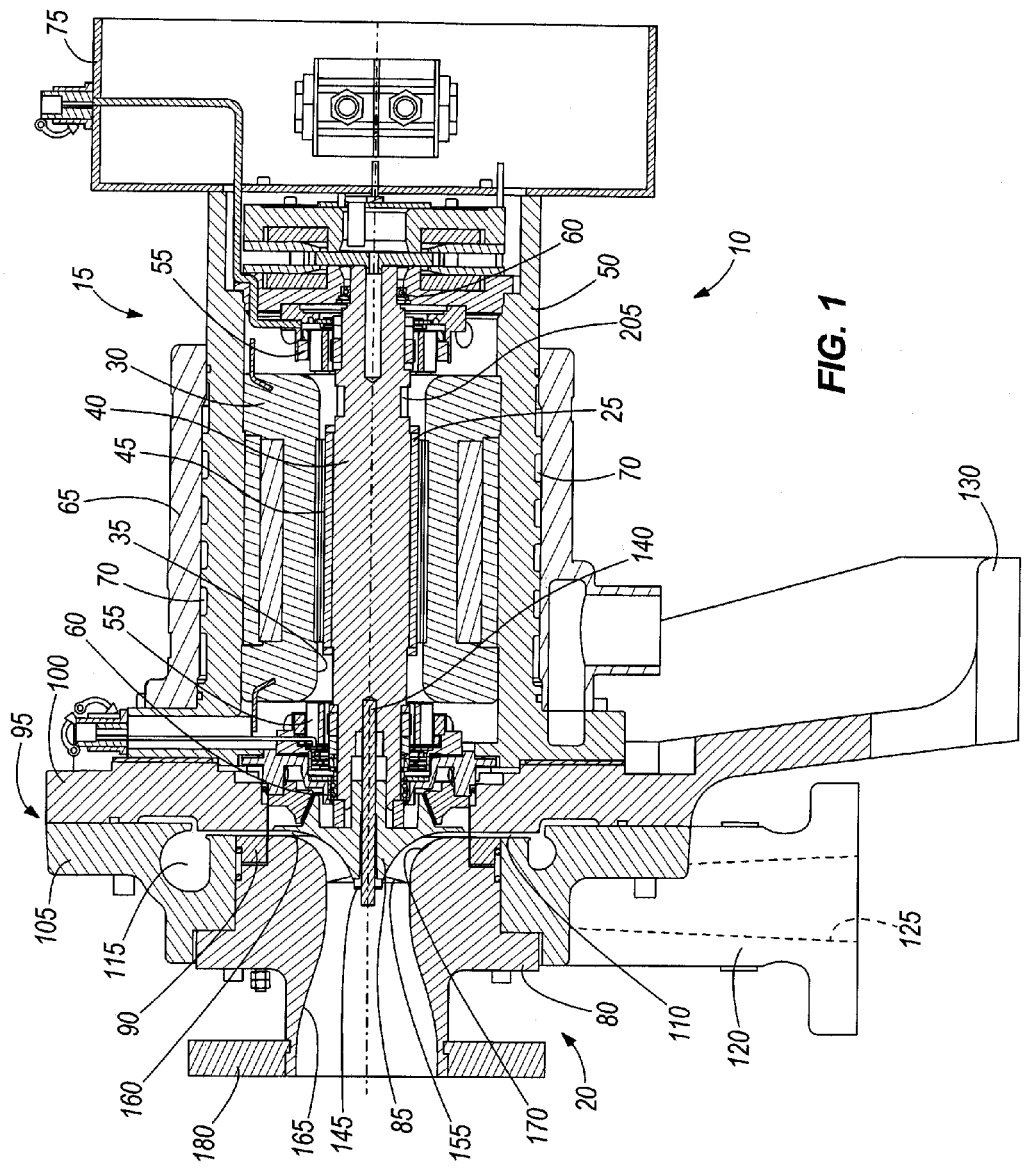
FIG. 1 is a cross-section of a high speed compressor embodying the invention and including a blower in a first position.

FIG. 1 illustrates a fluid compression system 10 that includes a prime mover, such as a motor 15 coupled to a compressor 20 that is operable to produce a compressed fluid. In the illustrated construction, an electric motor 15 is employed as the prime mover. However, other constructions may employ other prime movers such as, but not limited to, internal combustion engines, diesel engines, combustion turbines, etc.

The electric motor 15 includes a rotor 25 and a stator 30 that defines a stator bore 35. The rotor 25 is supported for rotation on a shaft 40 and is positioned substantially within the stator bore 35. The illustrated rotor 25 includes permanent magnets 45 that interact with a magnetic field, produced by the stator 30 to produce rotation of the rotor 25 and the shaft 40. The magnetic field of the stator 30 can be varied to vary the speed of rotation of the shaft 40. Of course, other constructions may employ other types of electric motors (e.g., synchronous, induction, brushed DC motors, etc.) if desired.

The motor 15 is positioned within a housing 50 which provides both support and protection for the motor 15. A bearing 55 is positioned on either end of the housing 50 and is directly or indirectly supported by the housing 50. The bearings 55 in turn support the shaft 40 for rotation. In the illustrated construction, active magnetic bearings 55 are employed with other bearings (e.g., roller, ball, needle, etc.) also suitable for use. In the construction illustrated in FIG. 1, secondary bearings 60 are employed to provide shaft support in the event one or both of the magnetic bearings 55 fail.

In some constructions, an outer jacket 65 surrounds a portion of the housing 50 and defines cooling paths 70 therebetween. A liquid (e.g., glycol, refrigerant, etc.) or gas (e.g., air, carbon dioxide, etc.) coolant flows through the cooling paths 70 to cool the motor 15 during operation.

An electrical cabinet 75 may be positioned at one end of the housing 50 to enclose various items such as a motor controller, breakers, switches, and the like. The motor shaft 40 extends beyond the opposite end of the housing 50 to allow the shaft to be coupled to the compressor 20.

The compressor 20 includes an intake housing 80 or intake ring, an impeller 85, a diffuser 90, and a volute 95. The volute 95 includes a first portion 100 and a second portion 105. The first portion 100 attaches to the housing 50 to couple the stationary portion of the compressor 20 to the stationary portion of the motor 15. The second portion 105 attaches to the first portion 100 to define an inlet channel 110 and a collecting channel 115. The second portion 105 also defines a discharge portion 120 that includes a discharge channel 125 that is in fluid communication with the collecting channel 115 to discharge the compressed fluid from the compressor 20.

In the illustrated construction, the first portion 100 of the volute 95 includes a leg 130 that provides support for the compressor 20 and the motor 15. In other constructions, other components are used to support the compressor 20 and the motor 15 in the horizontal position. In still other constructions, one or more legs, or other means are employed to support the motor 15 and compressor 20 in a vertical orientation or any other desired orientation.

The diffuser 90 is positioned radially inward of the collecting channel 115 such that fluid flowing from the impeller 85 must pass through the diffuser 90 before entering the volute 95. The diffuser 90 includes aerodynamic surfaces 135 (e.g., blades, vanes, fins, etc.), shown in FIG. 2, arranged to reduce the flow velocity and increase the pressure of the fluid as it passes through the diffuser 90.

The impeller 85 is coupled to the rotor shaft 40 such that the impeller 85 rotates with the motor rotor 25. In the illustrated construction, a rod 140 threadably engages the shaft 40 and a nut 145 threadably engages the rod 140 to fixedly attach the impeller 85 to the shaft 40. The impeller 85 extends beyond the bearing 55 that supports the motor shaft 40 and, as such is supported in a cantilever fashion. Other constructions may employ other attachment schemes to attach the impeller 85 to the shaft 40 and other support schemes to support the impeller 85. As such, the invention should not be limited to the construction illustrated in FIG. 1. Furthermore, while the illustrated construction includes a motor 15 that is directly coupled to the impeller 85, other constructions may employ a speed increaser such as a gear box to allow the motor 15 to operate at a lower speed than the impeller 85.

The impeller 85 includes a plurality of aerodynamic surfaces or blades 150 that are arranged to define an inducer portion 155 and an exducer portion 160. The inducer portion 155 is positioned at a first end of the impeller 85 and is operable to draw fluid into the impeller 85 in a substantially axial direction. The blades 150 accelerate the fluid and direct it toward the exducer portion 160 located near the opposite end of the impeller 85. The fluid is discharged from the exducer portion 160 in at least partially radial directions that extend 360 degrees around the impeller 85.

The intake housing 80, sometimes referred to as the intake ring, is connected to the volute 95 and includes a flow passage 165 that leads to the impeller 85. Fluid to be compressed is drawn by the impeller 85 down the flow passage 165 and into the inducer portion 155 of the impeller 85. The flow passage 165 includes an impeller interface portion 170 that is positioned near the blades 150 of the impeller 85 to reduce leakage of fluid over the top of the blades 150. Thus, the impeller 85 and the intake housing 80 cooperate to define a plurality of substantially closed flow passages 175.

In the illustrated construction, the intake housing 80 also includes a flange 180 that facilitates the attachment of a pipe or other flow conducting or holding component. For example, a filter assembly could be connected to the flange 180 and employed to filter the fluid to be compressed before it is directed to the impeller 85. A pipe would lead from the filter assembly to the flange 180 to substantially seal the system after the filter and inhibit the entry of unwanted fluids or contaminates.

Figure 2:
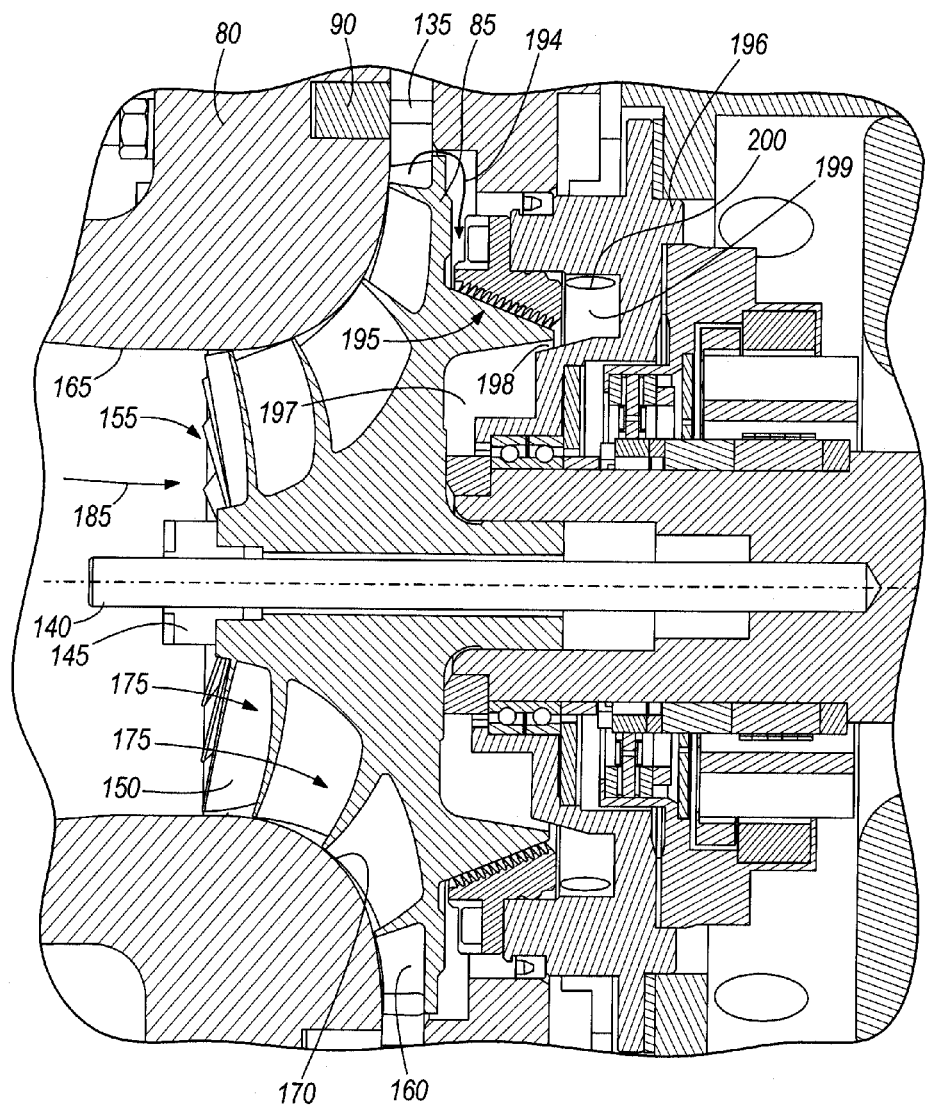
FIG. 2 is a cross-section view of a portion of the compressor of FIG. 1.

Turning to FIG. 2, the impeller 85 is illustrated in greater detail. The inducer portion 155 is substantially annular and draws fluid along an intake path 185 into the impeller 85. The fluid enters in a substantially axial direction and flows through the passages 175 defined between adjacent blades 150 to the exducer portion 160. A portion of this partially compressed fluid can leak around the outermost diameter of the impeller 85 to the back side of the impeller 85, thus defining a leakage flow 194. A seal 195 is positioned behind the impeller 85 to reduce the quantity of the leakage flow 194. However, some leakage flow 194 will generally flow through the seal 195. In the illustrated construction, a labyrinth seal formed as part of the impeller 85 is employed. Of course, other constructions may employ labyrinth seals positioned differently from that illustrated in FIG. 2, or may include different seal designs. Due to the rotational speed of the impeller 85, non-contact seals are preferred.

A bearing support housing 196 is coupled to the motor housing 50 and supports the bearings 55, 60 nearest the compressor 20. The bearing support housing 196 is positioned adjacent the impeller 85 such that the bearing support housing 196 and the impeller 85 cooperate to define a first space 197, a narrow flow path 198, and a second space 199. A vent aperture 200 provides fluid communication between the second space 199 and the atmosphere or another location for waste fluids (i.e., cooling air, leakage flow, etc.). The narrow flow path 198 provides fluid communication between the first space 197 and the second space 199.

Figure 3:
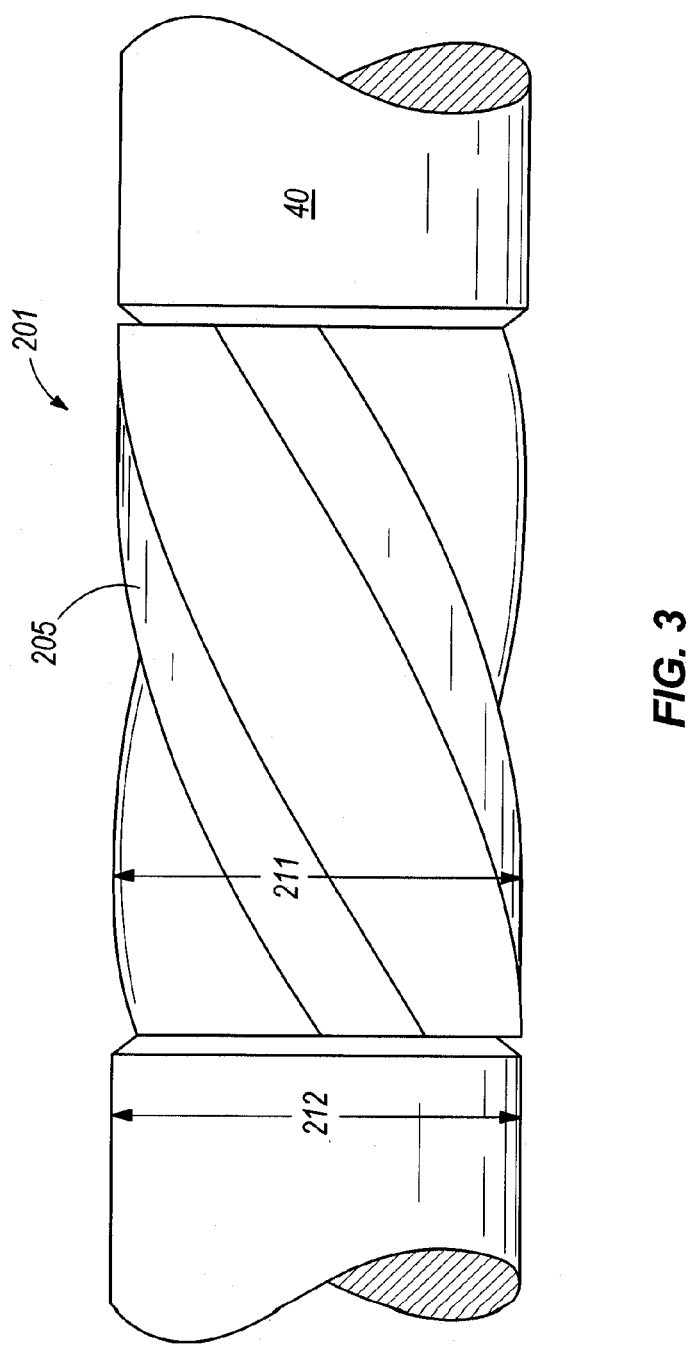
FIG. 3 is a side view of a portion of a rotor of FIG. 1 including the blower having flow-inducing elements.

FIG. 3 illustrates a portion of the shaft 40 including a blower 201 having flow-inducing elements 205 coupled to the shaft 40. The flow-inducing elements 205 (e.g., threads, blades, vanes, etc.) are positioned 360 degrees around a portion of the shaft 40 and are arranged to produce a flow of cooling air 210 (shown in FIGS. 7 and 8) in a desired direction in response to rotation of the shaft 40. The flow inducers 205 can be radially arranged at a predetermined angle or in a helical or screw orientation around the shaft 40 if desired. In a preferred construction, the flow-inducing elements 205 are integrally-formed as one component with the shaft 40. In these constructions, a single substantially homogeneous piece of material is cast, forged, etched, machined or otherwise formed to include the flow-inducing elements 205 as part of the shaft 40. In other constructions, the flow-inducing elements 205 can be welded, fastened, brazed or secured to the shaft 40 in such a way as to inhibit movement along the shaft 40 during rotation.

FIG. 3 illustrates flow-inducing elements 205 that define an outside diameter 211 that is less than or equal to the outer diameter 212 of the shaft 40 in the immediate vicinity. However, other constructions may employ flow-inducers 205 that have an outside diameter 211 that is greater than the outside diameter 212 of the shaft 40 in the immediate vicinity.

The flow-inducing elements 205 can be positioned nearly anywhere along the length of the shaft 40. For example, FIG. 1 illustrates the shaft 40 including the flow-inducing elements 205 positioned near the non-drive end bearing 55, 60. In this position, the flow-inducing elements 205 draw in air from outside the stator 30 and push the air through the motor 15.

Figure 4:
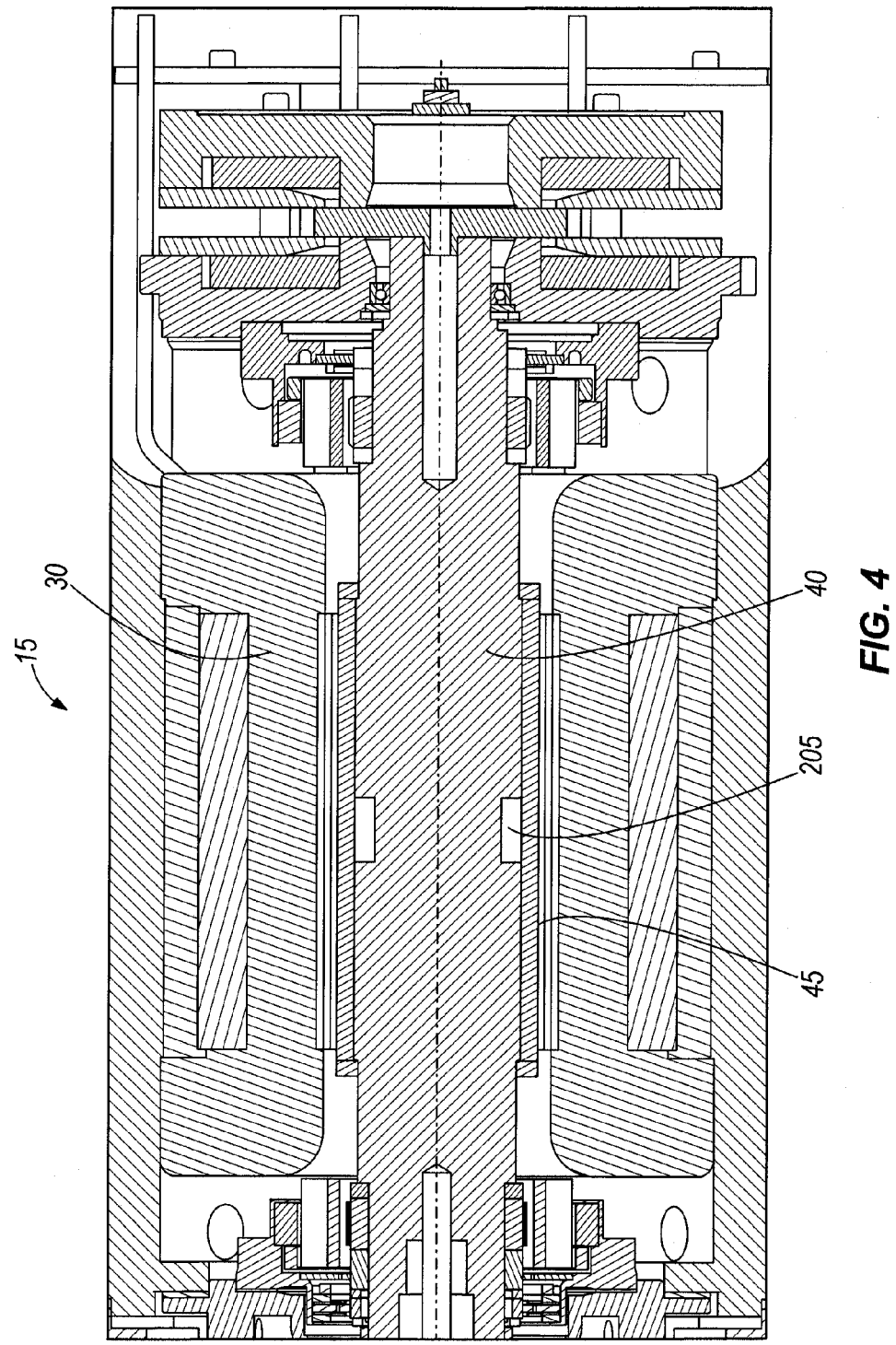
FIG. 4 is a cross-section of a motor including the blower of FIG. 3 in a second position.

FIG. 4 illustrates another construction in which the flow-inducing elements 205 are positioned within the stator 30. In this position, the flow-inducing elements 205 draw air into the stator 30, through a first portion of the stator 30, and then push the air through the remainder of the stator 30.

Figure 5:
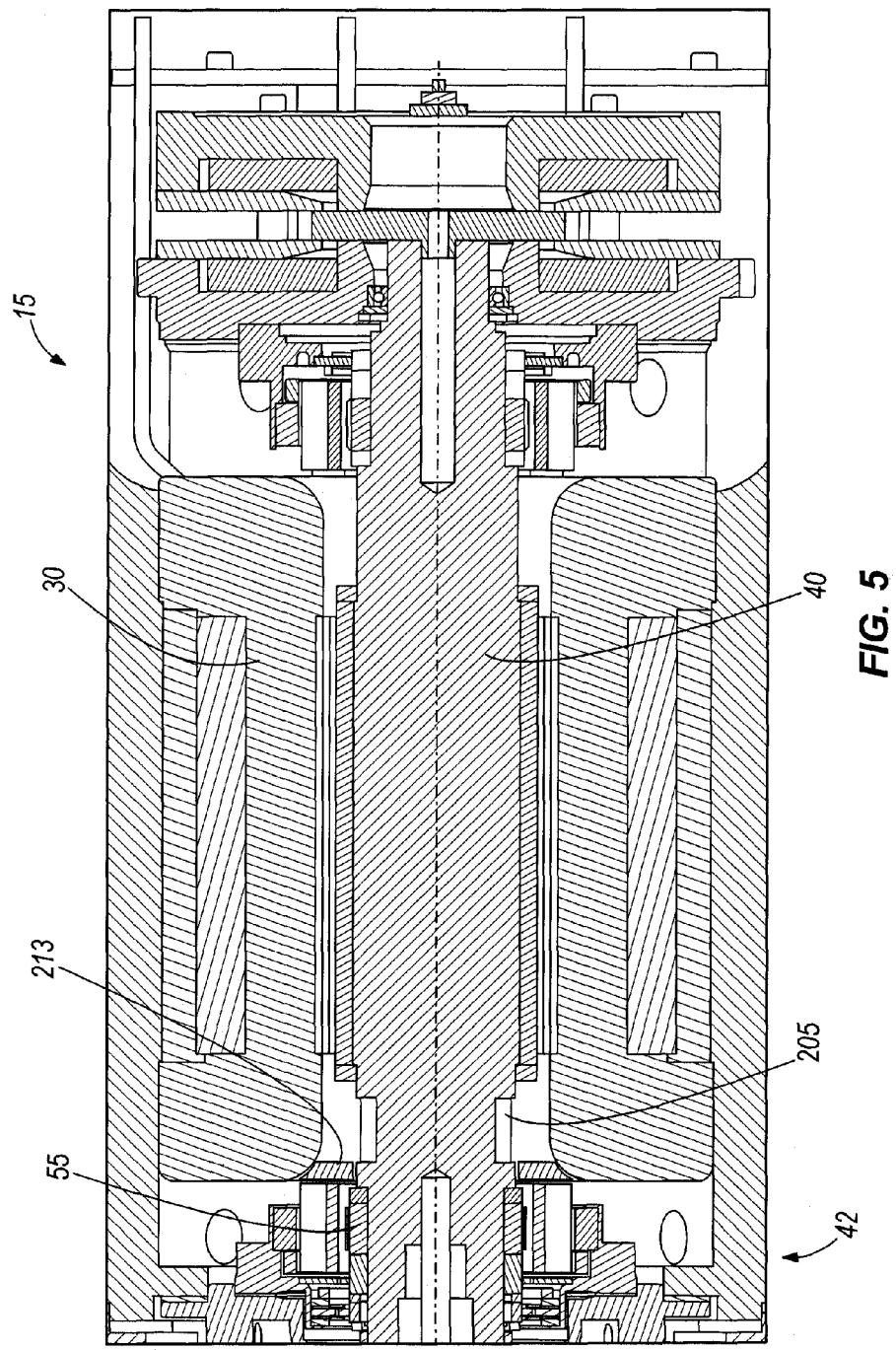
FIG. 5 is a cross-section of a motor including the blower of FIG. 3 in a third position.

FIG. 5 illustrates yet another arrangement in which the flow-inducing elements 205 are positioned near the drive end bearing 55. In this position, the flow-inducing elements 205 draw air through the stator 30 and then push the air out of the motor 15 toward the compressor 20.

Figure 6:
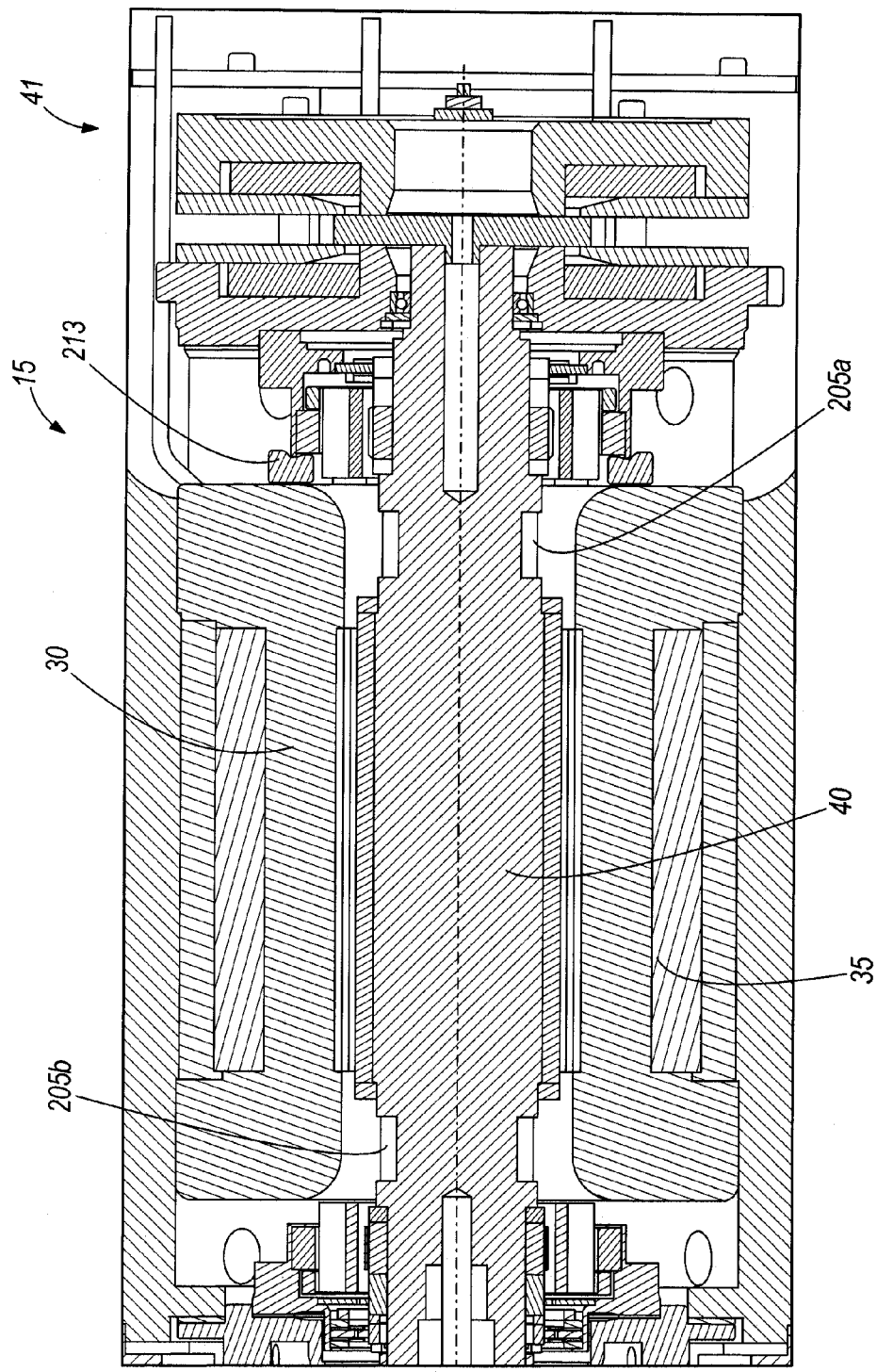
FIG. 6 is a cross-section of a motor including two blowers of FIG. 3 in two positions.

Other constructions may position the flow-inducing elements 205 in positions other than those illustrated herein. In addition, other constructions may include more than one set of flow-inducing elements 205. For example, FIG. 6 illustrates a construction that includes two sets of flow-inducing elements 205a, 205b positioned at opposite ends of the stator 30. The first set of flow-inducing elements 205a is positioned as illustrated in FIG. 1 with the second set of flow-inducing elements 205b positioned as illustrated in FIG. 5. Of course other arrangements and positions for the flow-inducing elements 205a, 205b are possible. In addition, flow-inducing elements having greater length or less length than those illustrated herein are also possible.

In addition to the flow-inducing elements 205, some constructions employ flow-equalizing vanes 213 positioned to guide the flow of cooling air either before or after passage through the flow-inducing elements 205. For example, FIG. 5 illustrates flow-equalizing vanes 213 downstream of the flow-inducing elements 205. Alternatively, FIG. 6 illustrates flow-equalizing vanes upstream of the flow-inducing elements 205.

Figure 7:
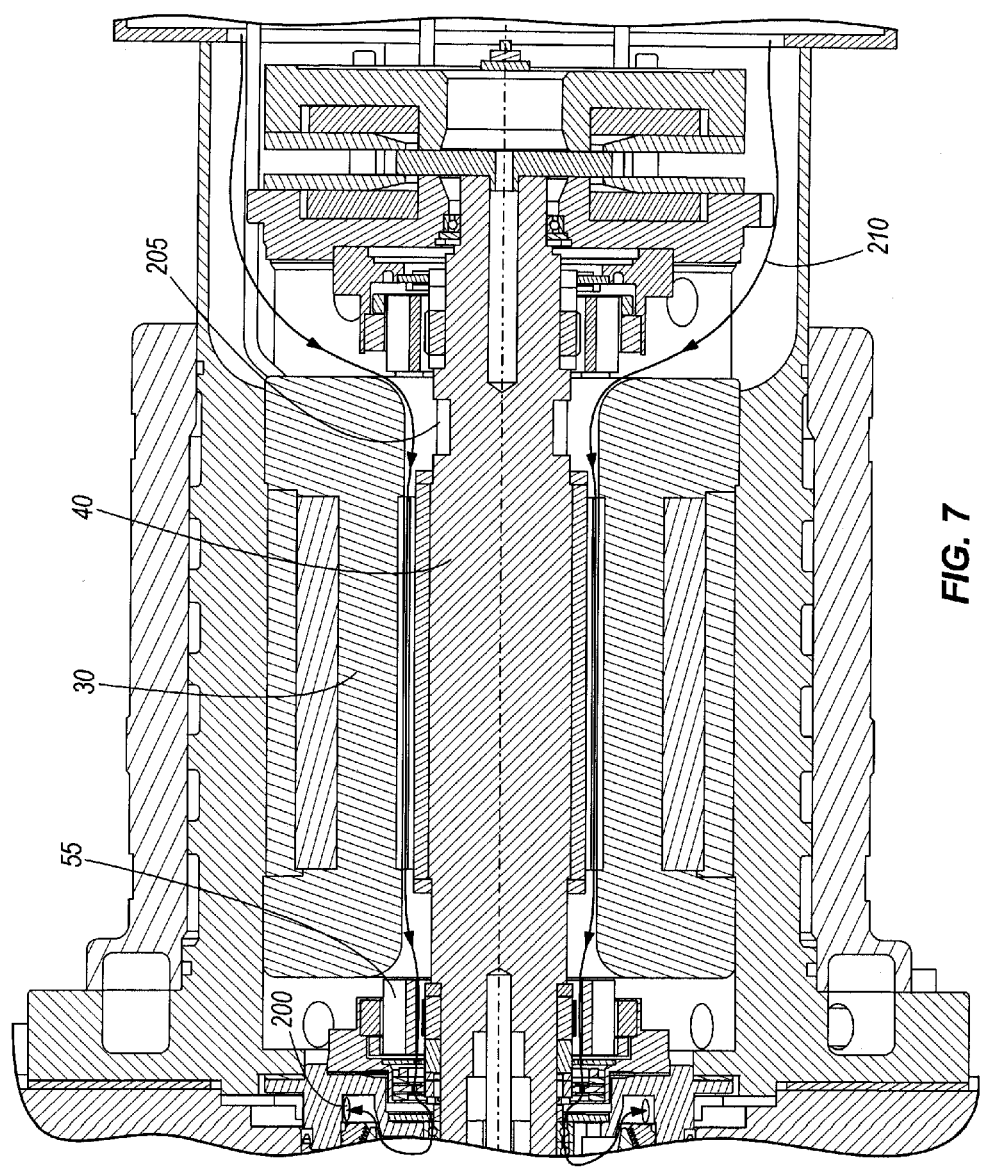
FIG. 7 is a cross-section view of a portion of the compressor system of FIG. 1 including flow paths therethrough.
Figure 8:
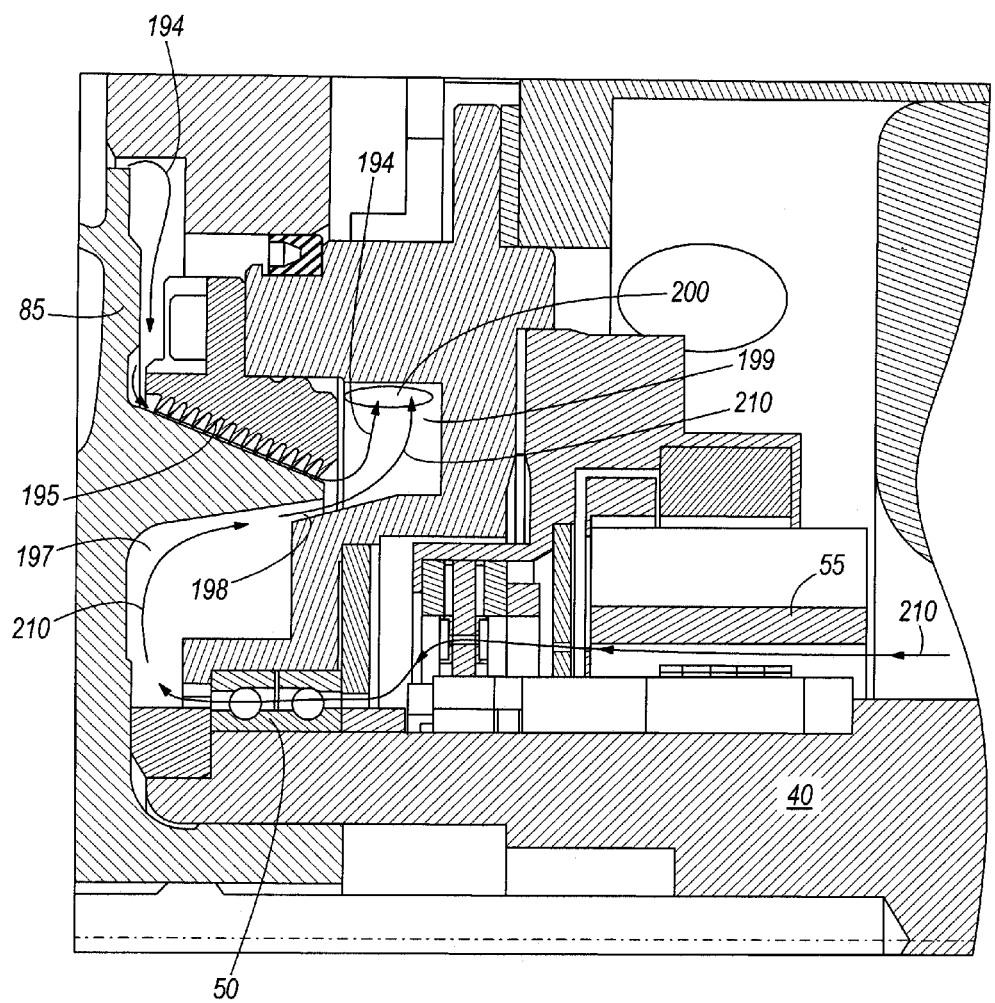
FIG. 8 is a cross-section view of an impeller of the compressor of FIG. 1 showing flow paths therethrough.

In operation, power is provided to the motor 15 to produce rotation of the shaft 40 and compressor 20. The magnetic bearing system 55 supports the shaft 40 for rotation. As illustrated in FIG. 7, the rotation of the shaft 40, and the flow-inducing elements 205 produces a corresponding flow of cooling air 210 that is directed into the motor 15. The cooling air 210 flows between the rotor 25 and the stator 30, through the bearings 55, 60 disposed adjacent the compressor 20 and into the first cavity 197 adjacent the back face of the impeller 85. As illustrated in FIG. 8, the flow of cooling air 210 next passes through the narrow opening 198 between the impeller 85 and a bearing support housing 196 and then out of the housing 196 through the vent aperture 200.

Rotation of the shaft 40 also produces rotation of the impeller 85 which starts the flow of compressed fluid. The leakage flow 194 passes over the outermost diameter of the impeller 85 and through the seal 195. The seal 195 is arranged to produce a drop in pressure of the leakage flow 194 such that, at the outlet of the seal 195, the pressure of the leakage flow 194 is slightly above atmospheric pressure, or the pressure of the waste area to which the vent aperture 200 leads. The flow-inducing elements 205 are positioned and arranged to produce the flow of cooling air 210 at a pressure that, after passing through the narrow opening 198 is slightly greater than the pressure of the leakage flow 194. Thus, the cooling air 210 not only cools the motor 15, but also establishes a seal at the narrow opening 198 that inhibits the passage of the hot leakage flow 194. Rather, both the flow of cooling air 210 and the leakage flow 194 pass through the vent aperture 200.

The use of the blower 201 integrally-formed as part of the shaft 40 reduces the complexity of the system, as no second motor is required to drive the blower 201. In addition, no control system for these additional components is required. In addition, the system illustrated herein produces a flow of air 210 that is directly related to the speed of the shaft 40 and thus the power consumed by the motor 15.

For example, as the rotor speed and consequently the power requirements and temperature of the motor 15 decrease, the quantity and pressure of the air provided by the flow-inducing elements 205 will also decrease. Thus, during periods of lower power operation, when the motor 15 naturally operates at a lower temperature, less cooling air 210 is provided by the flow-inducing elements 205. Also, during periods of higher power operation, or when the motor 15 is operating at a higher temperature, more cooling air 210 is provided by the flow-inducing elements 205. Therefore, a separate controller is not needed to set a separate blower speed in accordance with the motor temperature, since the system will naturally compensate for temperature and cooling requirement changes.

Thus, the invention provides, among other things, a compressor system 10 that includes a motor 15 and a shaft 40 having an integral blower system arranged to improve the performance of the motor 15. Various features and advantages of the invention are set forth in the following claims.

What is claimed is:

1. A fluid compression system comprising:
   a compressor operable to produce a flow of compressed gas, a portion of the flow of compressed gas leaking toward an electric motor as a leakage flow;
   the motor including a stator and a rotor positioned adjacent to the stator within a housing,
   a shaft coupled to the rotor to support the rotor for rotation and having a drive end connected to the compressor, and a non-drive end opposite the drive end and spaced further from the compressor than the drive end;
   a plurality of flow-inducing elements formed as a single piece with the shaft, spaced apart from the drive end and the non-drive end, the flow-inducing elements including an air inlet at a non-drive end of the flow-inducing elements and an air outlet at a drive end of the flow-inducing elements, the flow-inducing elements adapted to induce a flow of cooling air completely outside the shaft from the non-drive end toward the drive end in response to rotation of the shaft, wherein the shaft has a substantially uniform shaft diameter between the drive end and the flow-inducing elements, and wherein, the portion of the shaft including the flow-inducing elements defines an outside diameter that is less than or equal to the outside diameter of other portions of the shaft; and
   a cooling air flow path defined by the air inlet configured to ingress cooling air into the housing, a pathway formed between the rotor and stator in fluid communication with the inlet and a vent downstream of the pathway formed between the rotor and stator, the vent configured to egress the flow of cooling air and the leakage flow from the system.

2. The fluid compression system of claim 1, wherein the flow-inducing elements are machined into the shaft as a homogenous one-piece component.

3. The fluid compression system of claim 1, wherein the flow-inducing elements include helical channels that are machined into the shaft.

4. The fluid compression system of claim 1, wherein the flow-inducing elements include blades positioned around the shaft.

5. The fluid compression system of claim 1, wherein the flow of fluid induced by the flow-inducing elements being operable to inhibit the entry of the leakage flow into the motor.

6. The fluid compression system of claim 1, wherein the compressor includes a labyrinth seal between the flow of compressed gas and the flow-inducing elements.

7. A fluid compression system comprising:
a centrifugal compressor defining a high-pressure side and a low-pressure side, the compressor operable to produce a high-pressure flow that exits the compressor at the high-pressure side;
a housing containing at least a portion of the centrifugal compressor, the housing defining a vent that facilitates the passage of a portion of the high-pressure flow;
a motor shaft coupled to the centrifugal compressor and including a non-drive end and a drive end, the drive end positioned adjacent the compressor, and a blower formed as a single piece with the shaft and including an air inlet at a non-drive end of the blower and an air outlet at a drive end of the blower, the blower positioned between and apart from the non-drive end and the drive end and operable to induce a flow of cooling air completely outside of the motor shaft from the non-drive end toward the drive end such that the flow of cooling air exits the housing through the vent, wherein the shaft has a shaft diameter at the drive end and a blower diameter at the blower, the blower diameter being less than the shaft diameter; and
a cooling air flow path in fluid communication with the air inlet and the vent, the flow path defined by a passageway extending between a stator and a rotor of a motor and a passageway extending through at least one bearing member.

8. The fluid compression system of claim 7, wherein the flow of cooling air inhibits the entry of the portion of the high-pressure flow into the motor.

9. The fluid compression system of claim 7, wherein the blower is machined as part of the shaft.

10. The fluid compression system of claim 7, wherein the blower includes a plurality of blades positioned around the shaft.

11. The fluid compression system of claim 7, wherein a portion of the high-pressure flow leaks toward the motor as a leakage flow, the flow of cooling air being operable to inhibit the entry of the leakage flow into the motor.

12. The fluid compression system of claim 7, wherein the compressor includes a labyrinth seal between the high-pressure flow and the blower.

13. A fluid compression system comprising:
a housing assembly at least partially defining a vent aperture, a seal portion, and a cooling passage;
a centrifugal compressor at least partially supported by the housing assembly and adapted to produce a flow of high-pressure fluid, a portion of the high-pressure fluid passing through the seal portion and exiting the housing assembly through the vent aperture;
a motor including a rotor supported by a shaft having a first end and a second end, the motor coupled to the centrifugal compressor and operable to drive the compressor, the shaft including a blower formed as one piece with the shaft and spaced apart from the first end and the second end and operable in response to rotation of the shaft to produce a flow of cooling air within the cooling passage, the flow of cooling air inhibiting the passage of high-pressure fluid into the motor, wherein the shaft has a shaft diameter in the vicinity of the blower and a blower diameter at the blower, the blower diameter being less than the shaft diameter; and
wherein the cooling passage includes a flow path for the cooling air and is in fluid communication with an air inlet and the vent aperture, the flow path positioned between at least a portion of a stator and the rotor of the motor and extends through a portion of at least one of a magnetic bearing member and a rolling bearing member.

14. The fluid compression system of claim 13, wherein the flow of cooling air exits the housing assembly through the vent aperture.

15. The fluid compression system of claim 13, wherein the shaft rotates at a speed that is greater than or equal to about 20,000 revolutions per minute.

16. The fluid compression system of claim 13, wherein the shaft is supported by active magnetic bearings.

17. The fluid compression system of claim 13, wherein the compressor includes a labyrinth seal between the high-pressure flow and the blower.

* * * * *